July 30, 1929. A. T. TAECKER 1,722,689
AIR CLEANER FOR INTERNAL COMBUSTION ENGINES
Filed July 28, 1925
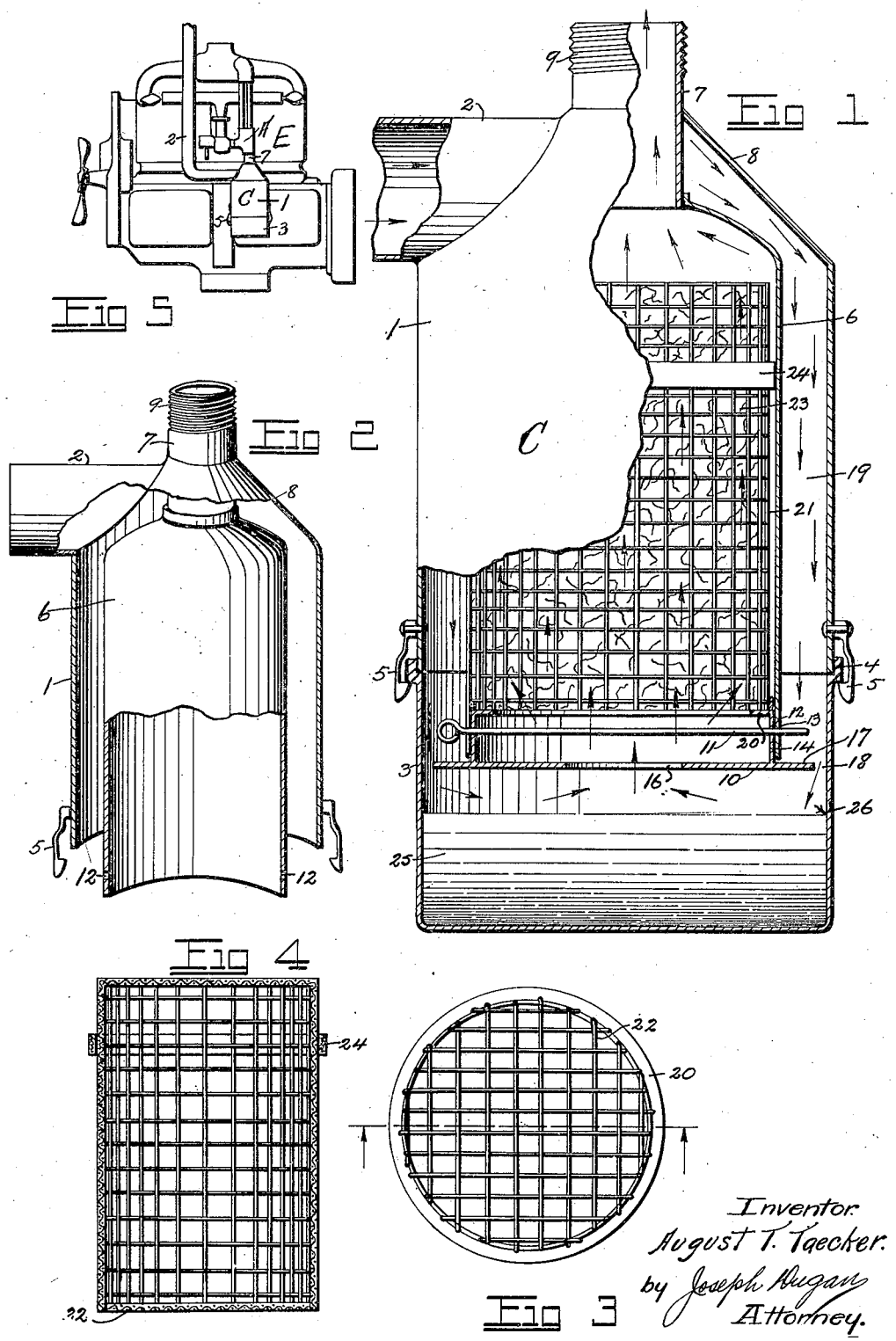
Inventor
August T. Taecker.
by Joseph Dugan
Attorney.

Patented July 30, 1929.

1,722,689

UNITED STATES PATENT OFFICE.

AUGUST T. TAECKER, OF BRAWLEY, CALIFORNIA.

AIR CLEANER FOR INTERNAL-COMBUSTION ENGINES.

Application filed July 28, 1925. Serial No. 46,677.

The invention forming the subject matter of this application is an air cleaner adapted to be connected to the air intake of the carburetor of an internal combustion engine, or to anything else requiring an influx of purified air or other gaseous fluid for its efficient operation.

An object of my invention is to provide a cleaner which may be fixedly and permanently secured to the carburetor and other suitable supporting parts of an internal combustion engine and having parts thereof readily detachable to provide for the cleaning, renewal or repair of the instrument as a whole without disturbing its fixed connection to the carburetor or the other supporting parts.

Another object of the invention is to provide a cleaner in which the impurities-removing efficiency of instruments of this type is greatly increased by causing the air drawn into the carburetor to be drawn first vertically downward toward and through a liquid trap and then vertically upward to the carburetor through a second porous trap. This vertical movement of the air stream in opposite vertical directions is of the utmost importance, because the heavier air impurities in the stream tend to fall by gravity into the first trap at the end of the descent of the air stream, and are also restrained by gravity from moving upward toward and through the second trap leading to the carburetor.

A further object is to provide a cleaner which is practically automatic in operation, extremely simple, easy and cheap to manufacture and use, and of the highest possible efficiency.

Other objects of the invention will appear as the detailed description thereof proceeds.

A preferred and practical embodiment of the invention is shown in the accompanying drawings, of which—

Figure 1 is a fragmentary sectional-elevation of my invention;

Figures 2, 3, and 4 are details; and

Figure 5 is an elevation of my invention as connected for use to the carburetor of an internal combustion engine.

In Figure 5, the cleaner C is shown as connected to the air intake A of the carburetor on the internal combustion engine E.

The cleaner itself comprises an outer tubular member 1 connected at its upper end to an air-conducting pipe 2, communicating with the atmosphere and having detachably connected to its lower end a receptacle 3 provided with seating flanges 4 adapted to cooperate with a plurality of spring latches 5 to lock receptacle 3 securely but releasably to the tubular member 1.

A tube 6 is concentrically arranged in member 1 and has at its upper end a neck 7 suitably secured to and projecting from the conical upper part 8 of the member 1 to form a screw-threaded end 9 for connecting the cleaner as a whole to the air intake A.

The tube 6 projects below the lower end of the member 1, and has a cartridge carrying cap 10 detachably secured thereto by means of a wire rod 11 passing through registering apertures 12 and 13 in the lower end of tube 6, said cap having an annular flange 14 projecting into said tube 6 from the cap 10.

The cap 10 is provided with a central aperture 16 and extends laterally as a flange 17 around the tube 6 to form a restricted passage 18 as a termination of the annular wide passage 19 formed by and between the tube 6 and the members 1 and 3. The flange 14 of the cap 10 is provided with an inwardly projecting annular flange 20 which is suitably fixed to the detachable reticulated bottom 22 of the reticulated cartridge 21. The bottom 22 is detachably secured by friction fit in the open end of the cartridge 21. The cartridge 21, as a whole, is therefore carried by the flange 20 of the cap 10, and can be readily removed therewith whenever it becomes necessary to clean or renew the cartridge. The cartridge is initially dipped in oil before inserting in the tube 6, the filtering oil in the cartridge being thereafter derived from the oil in the container 3.

The receptacle 21 is designed to be filled with some porous filtering material 23, such as steel wool, capable of being saturated with oil and of holding such oil in saturation. A band 24 of resilient material, such as felt, is secured to the upper part of said receptacle 21 and fits snugly against the inner wall of tube 6 to form a seal which compels air or other gas drawn to the carburetor to pass through the receptacle 21 and the filtering material therein.

The receptacle 3 is initially filled with light oil 25 up to a predetermined mark 26 on the inside of the receptacle to form a filtering trap therein.

In operation, the suction of the air through the air intake A of the engine carburetor draws air through the pipe 2 vertically downward through the passage 19 and through the restricted passage 18. The heavier particles of dust and dirt in the air drawn through the said passages 19 and 18 tend to continue their downward movement, because of the attraction of gravity thereon, and fall directly into the oil trap 25 to settle at the bottom of the receptacle 3. The air itself and the lighter impurities suspended therein pass with increased velocity through the restricted passage 18 in a somewhat arcuate path partly through the oil 25 and partly through the space between the oil and the cap 10 and through the aperture 16 to spread out for passage through the oil saturated steel wool of the cartridge 21.

In actual tests over periods of approximately twenty-five days, and repeated inspections during these periods, it has been found that the oil 25 maintained a practically constant level at the point 26. Depending upon the size of the clarifier, it appears that the distance between the cap 10 and the lever 26 of the oil 25 is determined by the suction of the carburetor. For example, it has been found that when the receptacle 3 was filled beyond the mark 26, determined empirically, the surplus oil was sucked up into the cartridge after a short period of engine operation. Even at the end of the periods mentioned, when the oil trap 25 was practically half filled with solid sediment, the oil level 26 was maintained. The mark 26 is thus determined by actual use of the instrument, and the oil trap need never be filled beyond this mark when the instrument is being set up for operation.

The oil saturated cartridge catches the fine impurities not trapped by gravity or the oil 25, and it has been found that the upper part of the cartridge remained free of impurities, even after extended use, while the lower parts contained dirt and other impurities decreasing in quantity as parts increased in distance from the cap 10. This is, of course, to be expected from the construction of the instrument.

It will be noted that the parts can be detached very readily for cleansing or for renewal; the receptacle 3 can be dropped by merely releasing the latches 5, and the cap 10 with its filtering cartridge can then be removed from the tube 6, by sliding the pin 11 out of the apertures 12 and 13. The removal or assembly of these parts does not involve any disturbance of the parts which secure the clarifier as a whole to the engine.

Having thus described my invention, what I claim as new and desire to secure by Letters Patent is:—

1. An air cleaner comprising two vertical tubes, one secured concentrically within the other to form an air conducting passage therebetween, the lower end of the outer tube being spaced above the lower end of the inner tube, a receptacle detachably connected to the lower end of the outer tube and extending below the end of the inner tube and adapted to contain a liquid air-impurities trap, a liquid saturated cartridge in said inner tube, means for supporting said cartridge in said tube, and means below the end of the outer tube for locking said supporting means in said inner tube.

2. An air filter comprising a pipe adapted to be connected to the air intake of a carburetor and depend vertically therefrom; an imperforate cylinder of larger diameter than said pipe and having a dome-shaped upper end surrounding and fixed to the lower end of said pipe; a filtering cartridge in said cylinder; an apertured cap detachably seated in the lower end of said cylinder; means for releasably securing said cap in said lower end to support said cartridge in said cylinder; a second cylinder of larger diameter than the first and having a conical upper end surrounding and fixed to said pipe above the lower end thereof, said pipe and cylinders having a common longitudinal axis, with the lower end of said second cylinder above the lower end of the first named cylinder; an air intake pipe extending laterally from said conical upper end; a receptacle having a flange fitting snugly over the lower end of said second cylinder, and latches on said second cylinder engageable with said flange to releasably secure said receptacle thereto, said receptacle being adapted to contain a filtering medium.

3. The combination with the instrument set forth in claim 2, of an annular flange extending laterally from said cap to restrict the air space between said cylinders.

4. An air cleaner comprising a closed receptacle having an air conducting pipe connected thereto, a tube secured to and extending into said receptacle to form an air conducting passage communicating with said pipe, an apertured cap on the end of said tube and having a flange extending laterally therefrom to restrict said passage, and a porous air-impurities trap carried by said cap in said tube.

5. The device set forth in claim 4 in combination with means for detachably locking said cap to said tube.

6. An air filter comprising a tube adapted to be connected to the air intake of a carburetor and depend vertically therefrom, a second tube of larger diameter than the first named tube and mounted concentrically thereon, a filtering cartridge removably positioned in the first named tube, means adjacent the lower end of the first named tube for releasably locking said cartridge in the first named tube, and a container for a liquid detachably connected to the second named tube above said locking means and extending below the lower end of the first named tube.

In testimony whereof I have signed my name to this specification.

AUGUST T. TAECKER.